Figure 1:
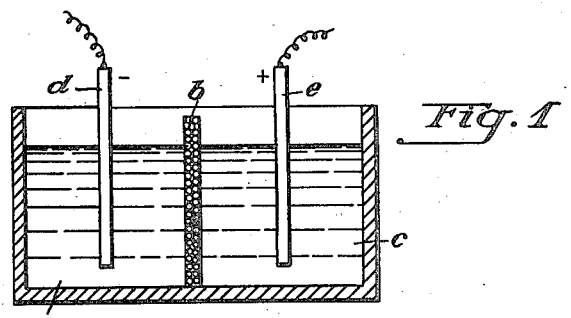

Patented Nov. 1, 1932

1,885,831

UNITED STATES PATENT OFFICE

KURT ILLIG, OF BERLIN-WILMERSDORF, AND NIKOLAUS SCHÖNFELDT, OF BERLIN-CHARLOTTENBURG, GERMANY, ASSIGNORS TO SIEMENS-ELEKTRO-OSMOSE G. M. B. H., OF SIEMENSSTADT, NEAR BERLIN, GERMANY, A CORPORATION OF GERMANY

PROCESS FOR THE SEPARATION OF RUBBER

Application filed March 5, 1929, Serial No. 344,579, and in Germany March 14, 1928.

The anodic or cathodic separation by electro-osmose of negatively and also positively charged particles in solutions, under the action of a direct current, is known.

The invention relates to an improvement in such processes now known, in the sense that the gas produced at the electrodes is considerably reduced or suppressed altogether, and a non-porous and easily detachable product is deposited on the anode or on a porous body (diaphragm) placed before the anode.

According to the invention a water-soluble dielectric liquid such as glycerine or another polyhydric alcohol is added to the solution to be treated such as latex in such an amount that the electro-osmose can be then carried out by the use of a direct current of high potential, i. e. at least 250 volts, but preferably above 400 volts.

In general the quality of the separated product may be altered by a variation of the potential, in many cases for example, the quality is improved by an increase of the potential.

If desired, the new process may be used also for such solutions as, by the addition of compounds containing higher valency cations, such as nitrate of thorium or of colloids, are so altered in character, that the particles contained therein originally travelling to the anode will, after the addition mentioned, travel to the cathode.

1st example of use

To an ammoniacal latex solution, glycerine was added in the proportion of 1:2, and the electro-osmose then carried out with the use of a direct current potential of about 500 volts. An anodic separation of rubber of great elasticity took place. The rubber produced in this manner is very good for sanitary purposes. If to a previously treated latex solution a small quantity of a solution containing a cation of a valency higher than 2, for example, a thorium nitrate solution, was added before the addition of the glycerine, the rubber was separated, after the addition of the glycerine, at the cathode. It thus appears advisable to choose a pH value smaller than 7.

2nd example of use

One part of commercial latex was mixed with three parts of glycerine. Lead electrodes were used. A current of a voltage of 480 volts was supplied to the electrodes. The current density was 7,6 milliamperes for 1 sq. cm. The duration of the test was 15 minutes. The quality of the rubber deposited on the anode was very good. It was quite free from gaseous inclusions and easily detachable from the anode.

3rd example of use

The same apparatus as in the 2nd example was filled with a mixture containing one part of commercial latex and one part of glycerine. The current had a voltage of 280 volts. The average current density was 3,3 milliamperes for 1 sq. cm. The rubber deposited in this manner was not so good as in the 2nd example. It was only possible to obtain during 7 minutes a rubber deposition.

If in the Examples 2 and 3 instead of glycerine another polyhydric alcohol was used, quite equal results were obtained. By the addition of a small quantity of thorium nitrate the deposition of rubber was caused to take place on the cathode.

4th example of use

A mixture of yeast in water made from a yeast containing 27% of dry substance with an additional content of glycerine was electro-osmotised in a triple cell apparatus using a potential of about 10000 volts and about 50 milliampere current strength. Yeast was then separated at the anode.

The separation can take place either at the anode or on porous molds or diaphragms arranged in front of the electrodes. In all cases the new process gives valuable separation products with a small expenditure of energy.

The invention may also be carried out by placing the solution to be treated, as well as one of the electrodes, in a space which is separated by a porous diaphragm, impenetrable to the particles to be separated, from a second space containing the dielectric liquid and the other electrode. By a suitable shaping of the diaphragm and the proper selection of the materials from which it is made, on the one hand the shape, and on the other hand the quality of the separated product may be determined.

Figure 2:
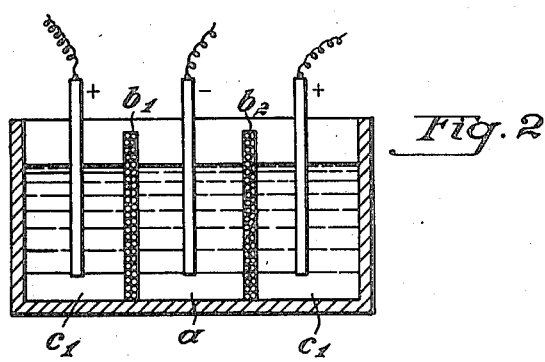
Figure 3:
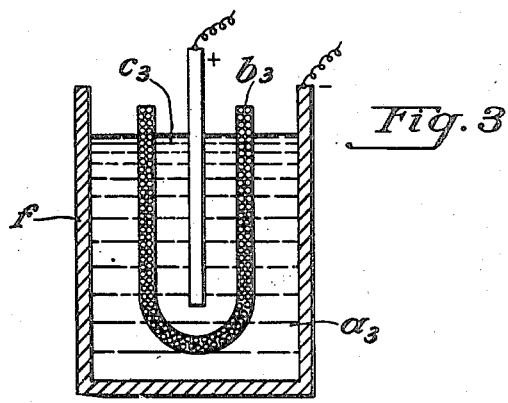

Several examples of construction of the apparatus which can be used in this case are shown in the accompanying drawing, in which Figs. 1, 2 and 3 are sectional elevations of the apparatus. In Figure 1 the solution is placed in a space $a$ which is separated by a diaphragm $b$ from a space $c$, in which is a dielectric liquid such as glycerine. The diaphragm may for example be composed essentially of powdered oxide of chromium. Parchment diaphragms have also given good results. In the space $a$ is also contained the cathode $d$, while the anode $e$ is contained in the space $c$. A direct current of high potential is used for the separation, the voltage depending on the dimensions of the two spaces $a$ and $c$.

In Figure 2 a further constructional form is shown, which differs from that of Figure 1 in that the solution to be treated is placed in a space $a$ separated on both sides by diaphragms $b_1$ and $b_2$ from two spaces $c_1$ containing a dielectric liquid such as transformer oil.

In Figure 3 a bag shaped diaphragm $b_3$ is used; the bath container $f$ is used as an electrode. If the space $c_3$ enclosed by the diaphragm $b_3$ is filled with a dielectric liquid and for example ammoniacal latex solution is contained in the outer space $a_3$, the latex is deposited on the outer surface of the diaphragm $b_3$ in a shape determined by the diaphragm. Care being taken that a perfectly uniform current distribution takes place between the electrodes, a rubber bag of equal thickness throughout may be obtained by this method.

The new apparatus may also be used in those processes in which particles originally travelling to the anode, will on the addition of solutions containing higher valency cations or of suitable colloids, travel to the cathode.

We claim:—

1. A process for the separation of rubber from latex by means of a direct current which comprises adding to the latex a water-soluble polyhydric alcohol, adding furthermore thorium nitrate to the latex and leading a direct current of a voltage higher than 400 volts through the mixture.

2. A process for the separation of rubber from an aqueous dispersion of rubber by means of a direct current which consists in passing such direct current through a liquid consisting of an equeous dispersion of rubber having a pH value smaller than 7, mixed with a water-soluble polyhydric alcohol.

3. A process for the separation of rubber from latex, which consists in mixing the latex with such an amount of a water-soluble polyhydric alcohol that the mixture will permit of the application of a direct current of at least 250 volts for the separation of the rubber, and passing a direct current of at least 250 volts through the mixture.

4. A process for the separation of rubber from latex, which consists in mixing the latex with about an equal amount of glycerine and passing a direct current of at least 250 volts through the mixture.

5. A process for the separation of rubber from an aqueous dispersion of rubber by means of a direct current which consists in passing a direct current having a voltage of at least 250 volts through a liquid consisting of an aqueous dispersion of rubber having a pH value smaller than 7, mixed with a water-soluble polyhydric alcohol.

In testimony whereof we affix our signatures.

KURT ILLIG.
NIKOLAUS SCHÖNFELDT.